US012574636B2

(12) United States Patent
Youn et al.

(10) Patent No.: US 12,574,636 B2
(45) Date of Patent: Mar. 10, 2026

(54) ELECTRONIC DEVICE AND METHOD FOR CONTROLLING PREVIEW IMAGE TO DIFFERENT MAGNIFICATIONS

(71) Applicant: Samsung Electronics Co., Ltd., Suwon-si (KR)

(72) Inventors: Sungwook Youn, Suwon-si (KR); Yanggeun Oh, Suwon-si (KR); Sungjoo Ahn, Suwon-si (KR); Hyunsuk Won, Suwon-si (KR); Byungjun Son, Suwon-si (KR); Jiyoon Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 89 days.

(21) Appl. No.: 18/164,068

(22) Filed: Feb. 3, 2023

(65) Prior Publication Data

US 2023/0188845 A1 Jun. 15, 2023

Related U.S. Application Data

(63) Continuation of application No. PCT/KR2021/009579, filed on Jul. 23, 2021.

(30) Foreign Application Priority Data

Aug. 4, 2020 (KR) ........................ 10-2020-0097615

(51) Int. Cl.
*H04N 23/67* (2023.01)
*G06V 10/22* (2022.01)
(Continued)

(52) U.S. Cl.
CPC ............. *H04N 23/67* (2023.01); *G06V 10/22* (2022.01); *G06V 10/25* (2022.01); *H04N 23/611* (2023.01);
(Continued)

(58) Field of Classification Search
CPC ...... H04N 23/60; H04N 23/61; H04N 23/611; H04N 23/62–64; H04N 23/667;
(Continued)

(56) References Cited

U.S. PATENT DOCUMENTS 5,434,621 A 7/1995 Yu
5,574,535 A 11/1996 Ogasawara
(Continued)

FOREIGN PATENT DOCUMENTS

JP 3429194 B2 7/2003
JP 2003274259 A 9/2003
(Continued)

OTHER PUBLICATIONS

International Search Report and Written Opinion for International Application No. PCT/KR2021/009579; Application Filing Date Jul. 23, 2021; Date of Mailing Nov. 5, 2021 (9 pages).
(Continued)

*Primary Examiner* — Twyler L Haskins
*Assistant Examiner* — Akshay Trehan
(74) *Attorney, Agent, or Firm* — CANTOR COLBURN LLP

(57) ABSTRACT

At least one processor included in an electronic device may: execute a camera; detect a first object within a field of view (FOV) of the camera; display a first preview image based on a first region of interest (ROI) including the first object on a display at a first magnification; additionally detect a second object within the FOV while the first preview image is displayed on the display; and display a second preview image based on a second ROI including the first object and the second object on the display at a second magnification different from the first magnification.

18 Claims, 16 Drawing Sheets

(51) Int. Cl.

| | |
|---|---|
| *G06V 10/25* | (2022.01) |
| *G06V 40/16* | (2022.01) |
| *H04N 23/611* | (2023.01) |
| *H04N 23/63* | (2023.01) |
| *H04N 23/667* | (2023.01) |
| *H04N 23/68* | (2023.01) |
| *H04N 23/69* | (2023.01) |

(52) U.S. Cl.
CPC ......... *H04N 23/632* (2023.01); *H04N 23/667* (2023.01); *H04N 23/687* (2023.01); *H04N 23/69* (2023.01); *G03B 2205/0046* (2013.01); *G06V 40/161* (2022.01)

(58) Field of Classification Search
CPC .... H04N 23/67; H04N 23/675; H04N 23/687; H04N 23/69; G03B 2205/0046; G06V 10/22; G06V 10/25; G06V 40/161
See application file for complete search history.

(56) References Cited

U.S. PATENT DOCUMENTS

| | | | | |
|---|---|---|---|---|
| 8,319,883 | B2* | 11/2012 | Hada | H04N 5/2628 348/346 |
| 8,456,536 | B2* | 6/2013 | Sugino | H04N 23/62 348/346 |
| 9,883,097 | B2 | 1/2018 | Cardei et al. | |
| 9,894,280 | B2* | 2/2018 | Sakaguchi | H04N 23/61 |
| 10,419,683 | B2 | 9/2019 | Ogawa | |
| 10,819,911 | B2 | 10/2020 | Ryu et al. | |
| 2005/0052533 | A1 | 3/2005 | Ito et al. | |
| 2007/0146528 | A1* | 6/2007 | Yanagi | H04N 23/635 348/E5.045 |
| 2008/0240563 | A1* | 10/2008 | Takano | H04N 23/635 382/173 |
| 2013/0076945 | A1 | 3/2013 | Nagata | |
| 2014/0078173 | A1 | 3/2014 | Takano et al. | |
| 2014/0132735 | A1* | 5/2014 | Lee | H04N 23/698 348/47 |
| 2016/0381282 | A1* | 12/2016 | Bandlamudi | H04N 23/69 348/240.3 |
| 2017/0150066 | A1* | 5/2017 | Hirooka | H04N 23/69 |
| 2018/0276841 | A1* | 9/2018 | Krishnaswamy | G06V 10/25 |
| 2019/0303708 | A1 | 10/2019 | Kim et al. | |
| 2020/0128181 | A1 | 4/2020 | An | |
| 2020/0162681 | A1 | 5/2020 | Hirooka et al. | |
| 2020/0177818 | A1* | 6/2020 | Kagaya | H04N 23/633 |

FOREIGN PATENT DOCUMENTS

| | | |
|---|---|---|
| JP | 2007180664 A | 7/2007 |
| JP | 4687451 B2 | 5/2011 |
| JP | 2011151482 A | 8/2011 |
| JP | 5791448 B2 | 10/2015 |
| JP | 2019134438 A | 8/2019 |
| KR | 0147572 B1 | 9/1998 |
| KR | 100676232 B1 | 1/2007 |
| KR | 20130094493 A | 8/2013 |
| KR | 20180037375 A | 4/2018 |
| KR | 20190014638 A | 2/2019 |
| KR | 20190115722 A | 10/2019 |
| KR | 20200043818 A | 4/2020 |

OTHER PUBLICATIONS

Search Report issued in European Patent Application No. 21852368. 6; Application Filing Date Jul. 23, 2021; Date of Mailing Dec. 4, 2023 (7 pages).
Korean Office Action corresponding to Application No. KR 10-2020-0097615; Dated Feb. 3, 2025.
European Office Action corresponding to Application No. EP21852368. 6; Dated Oct. 23, 2025.
Korean Office Action corresponding to Application No. KR10-2020-0097615; Dated Oct. 28, 2025.

* cited by examiner

START

DETERMINE WHETHER MOTION OF THE
OBJECT IS STABLE — 611

CHANGE REGION OF INTEREST WHEN
FIRST CONDITION FOR CHANGING REGION
OF INTEREST IS SATISFIED — 613

END

START

DETERMINE REGION OF INTEREST AS PREVIEW
REGION TO BE OUTPUT AS PREVIEW IMAGE    ∿710

ADJUST PREVIEW REGION ACCORDING TO
RATION OF PREVIEW IMAGE    ∿720

OUTPUT PREVIEW IMAGE, BASED ON SIZES
AND LOCATIONS OF ADJUSTED PREVIEW
REGION AND CURRENT PREVIEW IMAGE    ∿730

END

ELECTRONIC DEVICE AND METHOD FOR CONTROLLING PREVIEW IMAGE TO DIFFERENT MAGNIFICATIONS

CROSS-REFERENCE TO RELATED APPLICATIONS

This application is a continuation of International Application No. PCT/KR2021/009579 designating the United States, filed on Jul. 23, 2021, in the Korean Intellectual Property Receiving Office and claiming priority to Korean Patent Application No. 10-2020-0097615, filed on Aug. 4, 2020, in the Korean Intellectual Property Office, the disclosures of all of which are incorporated by reference herein in their entireties.

TECHNICAL FIELD

Embodiments disclosed herein relate to an electronic device for controlling a preview image and a method thereof.

BACKGROUND ART

Functions of portable terminals have been recently diversified and improved. Therefore, demand for improvement in photo taking or video recording functions is also increasing, and accordingly, portable terminals may perform various video recording functions. Particularly, in connection with outputting a preview image, an image with an adjusted zoom magnification may be output using a wide-angle camera or a telephoto camera.

In order to capture an image of a subject desired by a user, the portable terminal may be moved according to the motion of the subject, and a function of adjusting a zoom magnification may be used so that a desired object and background appear in a preview image.

DISCLOSURE OF INVENTION

Technical Problem

A method of processing an image by detecting an object through a camera and continuously tracking the detected object to adjust the focus thereof has been used. However, when the object is moving, a user may properly adjust the direction or position of a portable terminal to include the object into a preview image or track the object to display the object in the preview image. Even in this case, if the object minutely shakes, the preview image may also shake, causing inconvenience to the user.

Even for a plurality of objects, a portable terminal may exhibit various functions to, for example, recognize the objects and adjust a focus for the objects. However, existing portable terminals are unable to adjust the zoom magnification or the location of a preview image in consideration of the motions of multiple objects.

Technical Solution

Various embodiments of the disclosure may provide an electronic device and a method for controlling the electronic device, by which, when a plurality of objects are detected through a camera, the location and zoom magnification of a preview image may be adjusted according to the motions of the plurality of objects.

According to a non-limiting embodiment, an electronic device disclosed herein may include: a camera; a display; and at least one processor electrically connected to the camera and the display. The at least one processor may be configured to: execute the camera; detect a first object within a field of view (FOV) of the camera; display a first preview image based on a first region of interest (ROI) including the first object on the display at a first magnification; additionally detect a second object within the FOV while the first preview image is displayed on the display; and display a second preview image based on a second ROI including the first object and the second object on the display at a second magnification different from the first magnification.

In addition, a method for operating an electronic device according to an embodiment disclosed herein may include: executing a camera; detecting a first object within a field of view (FOV) of the camera; displaying a first preview image based on a first region of interest (ROI) including the first object on a display at a first magnification; additionally detecting a second object within the FOV while the first preview image is displayed on the display; and displaying a second preview image based on a second ROI including the first object and the second object on the display at a second magnification different from the first magnification.

In addition, an electronic device according to an embodiment disclosed herein may include: a camera; a display; and at least one processor electrically connected to the camera and the display. The at least one processor (e.g., the processor 210 in FIG. 2) may be configured to: detect a first object in an Mth frame, based on image data acquired through the camera; determine whether a first object region corresponding to the first object is included in a predefined region; track the first object region in case that the first object region is included in the predefined region; determine a first ROI, based on the tracked first object region; display a first preview image on the display at a first magnification, based on the determined first ROI; in case that a second object is additionally detected in an Nth frame, which is a frame after the Mth, determine whether a second object region corresponding to the second object is included in the predefined region; track the second object region in case that the second object region is included in the predefined region; determine a second ROI including the tracked first object region and the tracked second object region; and display a second preview image based on the determined second ROI on the display at a second magnification different from the first magnification.

Advantageous Effects of Invention

Various embodiments disclosed herein may provide a preview image based on the motions of a plurality of objects, without having to move a camera according to the objects.

In addition, various embodiments may provide a preview image which smoothly changes, by adaptively changing the preview image.

In addition, various effects that are identified directly or indirectly through this document may be provided.

BEST MODE FOR CARRYING OUT THE INVENTION

Hereinafter, various embodiments of this document will be described with reference to the accompanying drawings. However, this is not intended to limit the document to the specific embodiments, and it should be understood as including various modifications, equivalents, and/or alternatives of the embodiments of the disclosure.

Figure 1:
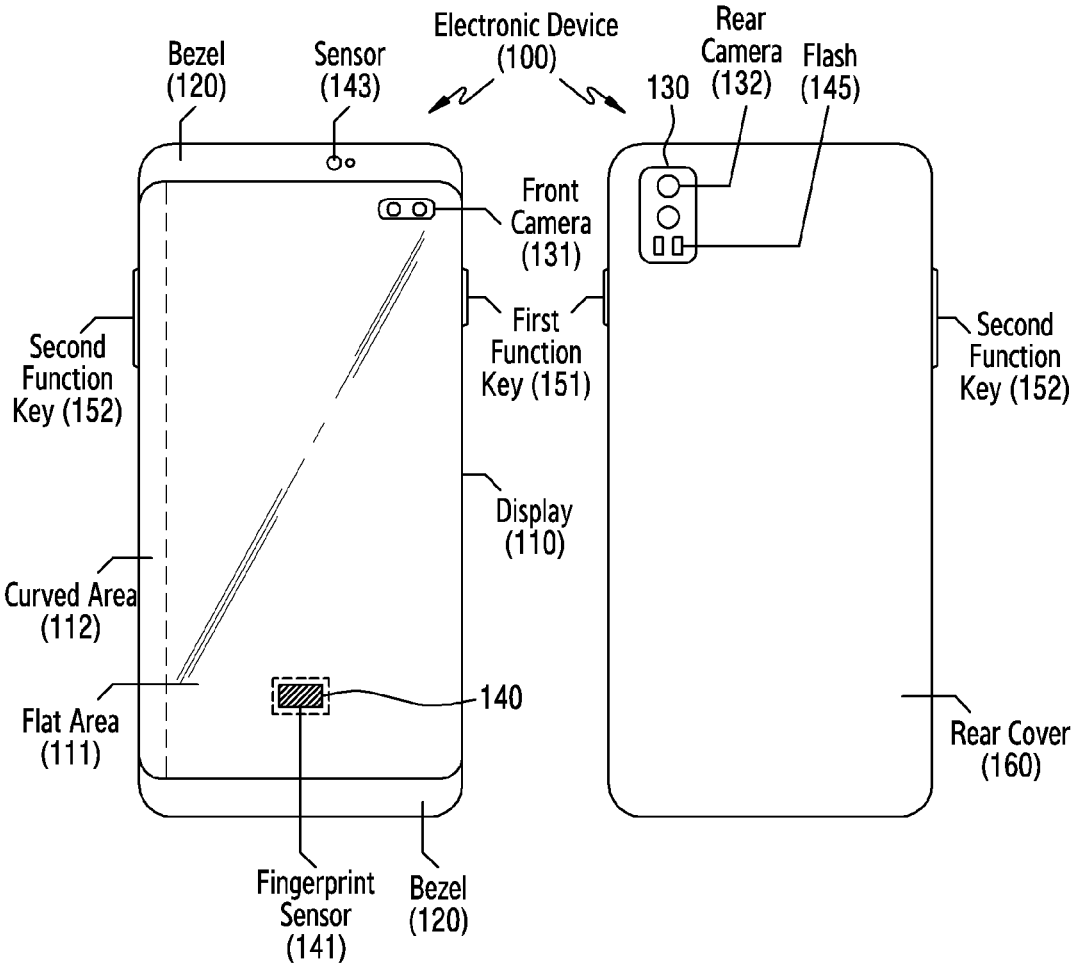
FIG. 1 illustrates an electronic device according to an embodiment.

FIG. 1 illustrates an electronic device according to an embodiment.

Referring to FIG. 1, a display 110 may be disposed on the front surface of an electronic device 100 according to an embodiment. In one embodiment, the display 110 may occupy most of the front surface of the electronic device 100. The display 110 and the region of a bezel 120 surrounding at least partial periphery of the display 110 may be disposed on the front surface of the electronic device 100. In the example of FIG. 1, the display 110 may include a flat area 111 and a curved area 112 extending from the flat area 111 toward the lateral surface of the electronic device 100. Although the curved area 112 is shown only on one side (e.g., the left side) in FIG. 1, it may be understood that the curved area is formed on the opposite side as well. In addition, the illustrated electronic device 100 of FIG. 1 is an example, and various embodiments are possible. For example, the display 110 of the electronic device 100 may include only the flat area 111 without the curved area 112 or may have the curved area 112 formed only on the periphery on one side rather than both sides. In addition, in one embodiment, the curved area may extend to the rear surface of the electronic device 100, and thus the electronic device 100 may also include an additional flat area.

In an embodiment, a fingerprint sensor 141 for recognizing a user's fingerprint may be included in the first area 140 of the display 110. The fingerprint sensor 141 may be disposed on a lower layer of the display 110 so as not to be visible to a user, or may be placed to make it difficult to be visible. In addition to the fingerprint sensor 141, a sensor for additional user/biometric authentication may be disposed in a partial region of the display 110. In another embodiment, the sensor for user/biometric authentication may be disposed in one region of the bezel 120. For example, an IR sensor for iris authentication may be exposed through one region of the display 110 or through one region of the bezel 120.

In an embodiment, a front camera 131 may be disposed on the front surface of the electronic device 100. In the embodiment of FIG. 1, the front camera 131 is illustrated as being exposed through one region of the display 110, but in another embodiment, the front camera 131 may be exposed through the bezel 120.

In an embodiment, the electronic device 100 may include one or more front cameras 131. For example, the electronic device 100 may include two front cameras such as a first front camera and a second front camera. In an embodiment, the first front camera and the second front camera may be the same type of cameras having the same specifications (e.g., pixels), but the first front camera and the second front camera may be implemented as cameras having different specifications. The electronic device 100 may support functions related to dual cameras (e.g., 3D photographing, auto focus, etc.) through two front cameras.

In an embodiment, a rear camera 132 may be disposed on the rear surface of the electronic device 100. The rear camera 132 may be exposed through a camera region 130 of a rear cover 160. In an embodiment, the electronic device 100 may include a plurality of rear cameras disposed in the camera region 130. For example, the electronic device 100 may include two or more rear cameras. For example, the electronic device 100 may include a first rear camera, a second rear camera, and a third rear camera. The first rear camera, the second rear camera, and the third rear camera may have different specifications. For example, FOV, pixels, aperture, support of optical zoom/digital zoom, support of an image stabilization function, and the type and arrangement of a set of lenses included in each camera of the first rear camera, the second rear camera, and/or the third rear camera may be different. For example, the first rear camera may be a normal camera, the second rear camera may be a camera for wide photographing, and the third rear camera may be a camera for telephoto photographing. In this document, descriptions of functions or characteristics of the front camera may be applied to the rear camera, and vice versa.

In an embodiment, various types of hardware or sensors that assist photographing, such as a flash 145, may be additionally disposed in the camera region 130. For example, a distance sensor (e.g., a TOF sensor) for detecting a distance between a subject and the electronic device 100 may be further included.

In an embodiment, at least one physical key may be disposed on a lateral portion of the electronic device 100. For example, a first function key 151 for turning on/off the display 110 or turning on/off the power of the electronic device 100 may be disposed on the right periphery of the electronic device 100, with reference to the front surface of the electronic device. In an embodiment, the second function key 152 for controlling the volume or screen brightness of the electronic device 100 may be disposed at the left periphery of the electronic device 100, with reference to the front surface of the electronic device. In addition to this, additional buttons or keys may also be disposed on the front surface or the rear surface of the electronic device 100. For example, a physical button or a touch button mapped to a specific function may be disposed in a lower region of the bezel 120 on the front surface.

The electronic device 100 illustrated in FIG. 1 corresponds to one example, and the shape of the device to which the technical idea disclosed in this document is applied is not limited. The technical idea disclosed in this document is applicable to various user devices having a first camera module facing a first direction and a second camera module facing a direction different from the first direction. For example, the technical idea disclosed in this document may also be applied to a foldable electronic device which is horizontally or vertically foldable by employing the flexible display 110 and a hinge structure, or a tablet or laptop computer. In addition, the technical idea of the disclosure may be applied even when the first camera module and the second camera module facing the same direction may be arranged to face different directions through rotation, folding, or deformation of the device.

Hereinafter, for convenience of explanation, various embodiments will be described based on the electronic device 100 shown in FIG. 1.

Figure 2:
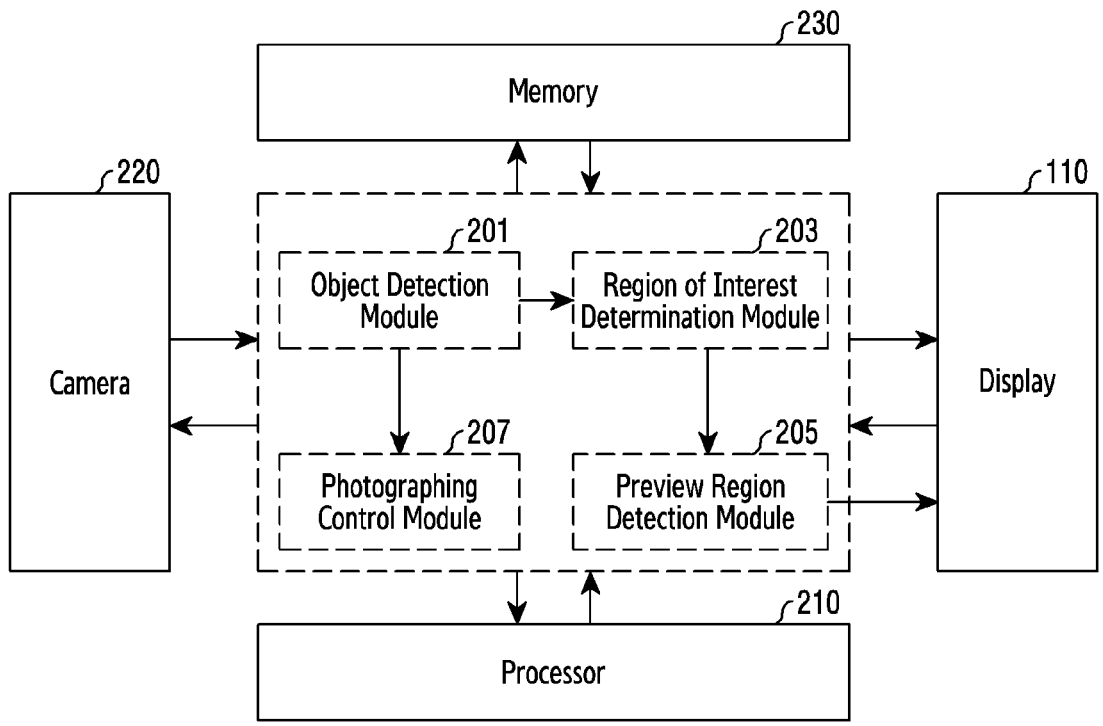
FIG. 2 illustrates a concept of controlling a function of displaying a preview image in an electronic device according to an embodiment.

FIG. 2 illustrates a concept of controlling a function of displaying a preview image by an electronic device according to an embodiment. In the description of FIG. 2, the components and/or functions described in FIG. 1 may be schematically described or omitted.

Referring to FIG. 2, the electronic device 100 may use hardware and/or software modules to support functions of displaying a preview image. For example, the processor 210 may drive an object detection module 201, a region of interest determination module 203, a preview region determination module 205, and a photographing control module 207 by executing instructions stored in the memory 230. In various embodiments, software modules other than those shown in FIG. 2 may be implemented. For example, at least two modules may be integrated into one module, or one module may be divided into two or more modules. In addition, work performance may be improved by hardware and software modules which share a single function. For example, the electronic device 100 may include both an encoder implemented as hardware and an encoder implemented as a software module, and a part of data acquired through at least one camera module may be processed by the hardware encoder and the other part may be processed by the software encoder.

In an embodiment, the object detection module 201 may detect an object through analysis of image data acquired through the camera 220. The object detection module 201 may perform face detection, face-related part detection (e.g., eyes, nose, mouth, ears), body detection, body-related part detection (e.g., arms, legs, neck), and gesture detection. The object may include an animal as well as a person and may also include an object such as a doll.

In an embodiment, the object detection module 201 may detect at least one object through various detection methods. The object detection module 201 may detect an object by using artificial intelligence such as machine learning. For example, the object detection module 201 may detect a body through a segmentation method. The various detection methods are not limited to a specific method, and may include various previously disclosed methods.

In an embodiment, the object detection module 201 may include at least a filter function. For example, the object detection module 201 may stably detect an object by applying a noise removal filter or a smoothing filter (e.g., an average filter) when a change in the detected object for each frame is excessive (e.g., is greater than a threshold). This may also be applied to the following object region and/or region of interest.

In an embodiment, when a specific gesture is detected, the object detection module 201 may transfer information on the specific gesture to the photographing control module 207.

In an embodiment, the region of interest determination module 203 may determine an object region corresponding to the detected object. The region of interest determination module 203 may determine the region of interest, based on the determined object region. The region of interest determination module 203 may detect a change in the object region every frame, and change (or update) the region of interest when the change is greater than or equal to a threshold value.

In an embodiment, the preview region determination module 205 may determine at least one of the configured regions of interest as a preview region. The preview region may be understood as a region to be displayed as a preview image in image data acquired through the camera 220. The preview region determination module 205 may adjust the determined preview region such that the region is matched to the resolution size of the preview image.

In an embodiment, the photographing control module 207 may provide a user interface (UI)/graphical UI (GUI) associated with the camera to a user through the display 110. In addition, the photographing control module 207 may control photographing in response to a user input received through a UI/GUI output to the display 110. For example, the photographing control module 207 may obtain a recording start/stop input from a user and transfer the obtained recording start/stop input to an encoder. The input obtained from the user may include an input obtained through a voice recognition function or may include detection of a specific gesture. For example, when the processor 210 recognizes voices such as "take a picture", "capture an image", and "stop photographing", the processor 210 may start/stop photographing in response thereto. Alternatively, when the processor 210 detects a gesture of showing a palm, the processor 210 may start/stop photographing in response thereto.

In an embodiment, the display 110 may display, on the display 110, contents such as an execution screen of an application executed by the processor 210 or an image and/or video stored in the memory 230. In addition, the processor 210 may display image data acquired through the camera 220 on the display 110 in real time. The display 110 may output, as a preview image, a preview region cropped and/or resized to be matched to the resolution of the current preview image.

In an embodiment, the image quality control module 350 may perform a stabilization operation on images acquired from the first camera module 231 and/or the second camera module 232. In an embodiment, the stabilization operation may include at least one of auto exposure (AE), auto focus (AF), and auto white balance (AWB). In addition, the picture quality control module 350 may improve the quality of an acquired image or apply a desired effect through an appropriate image quality control/tuning operation other than auto exposure, auto focus, and/or auto white balance.

In the embodiment of FIG. 2, functions performed by the object detection module 201, the region of interest determination module 203, the preview region determination module 205, and the photographing control module 207 may be understood to be performed by the processor 210 executing the instructions stored in the memory 230. In addition, in various embodiments, the electronic device 100 may use one or more hardware processing circuits to perform various functions and operations disclosed in this document. For example, an application processor (AP) included in a mobile device, an image signaling processor (ISP) mounted in a camera module, a DDIC, a touch IC, a communication processor (CP), a hardware encoder, and the like may be used for implementation of various embodiments disclosed in this document. In addition, the connection relationship between hardware/software shown in FIG. 2 is for convenience of description and does not limit the flow/direction of data or instructions. Components included in the electronic device 100 may have various electrical/operational connection relationships.

Figure 3:
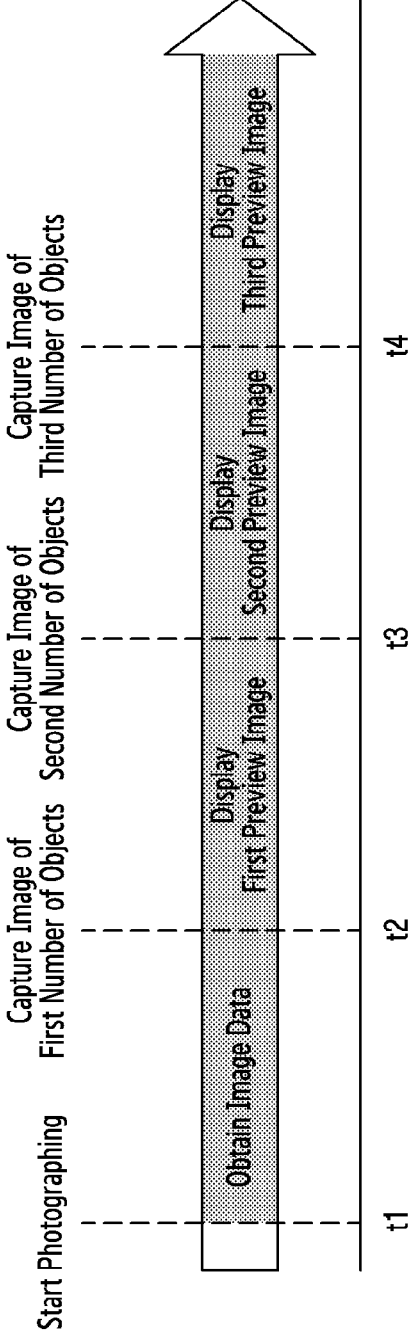
FIG. 3 schematically illustrates a scenario in case of detecting a plurality of objects over time by an electronic device according to an embodiment.

FIG. 3 schematically illustrates a scenario in a case of detecting a plurality of objects over time by an electronic device according to an embodiment.

In an embodiment, the processor 210 may obtain a user's input related to a request to start photographing, and the operations to start photographing through the camera 220 in response thereto. The processor 210 may acquire image data through the camera 220.

In an embodiment, the processor 210 may detect a first object included in the field of view of the camera 220 through the camera 220. The processor 210 may detect the first object included in the field of view of the camera 220 every frame. The processor 210 may determine a first object region corresponding to the detected first object. When a predetermined condition is satisfied, the processor 210 may track the first object region every frame. The processor 210 may determine a region of interest, based on the object region. The processor 210 may determine whether to maintain the region of interest or change the region of interest by detecting a change in the object region every frame. The processor 210 may determine a preview region, which is based on the maintained region of interest and/or the changed region of interest. The processor 210 may adjust the determined preview region to be matched to the resolution size of the preview image. The processor 210 may display the adjusted preview region on the display 210 as a first preview image.

In an embodiment, the processor 210 may additionally detect a second object within the field of view of the camera 220 while the first preview image is displayed on the display 110. The processor 210 may determine a second object region corresponding to the detected second object. When a predetermined condition is satisfied, the processor 210 may track the second object region every frame. The processor 210 may determine a region of interest, based on the first object region and/or the second object region. The processor 210 may determine whether to maintain the region of interest or change the region of interest by detecting a change in the first object region and/or the second object region every frame. The processor 210 may determine a preview region, based on the maintained region of interest and/or the changed region of interest. The processor 210 may adjust the determined preview region such that the region is matched to the resolution size of the preview image. The processor 210 may display the adjusted preview region on the display 210 as a second preview image.

In an embodiment, the processor 210 may additionally detect at least a third object within the field of view of the camera 220 while the second preview image is displayed on the display 110. The processor 210 may determine a third object region corresponding to the third object. When a predetermined condition is satisfied, the processor 210 may track the third object region every frame. When the processor 210 determines that at least three objects are included in a predefined region within the field of view of the camera 220, the processor 210 may perform a zooming out and display a third preview image on the display 110.

Figure 4:
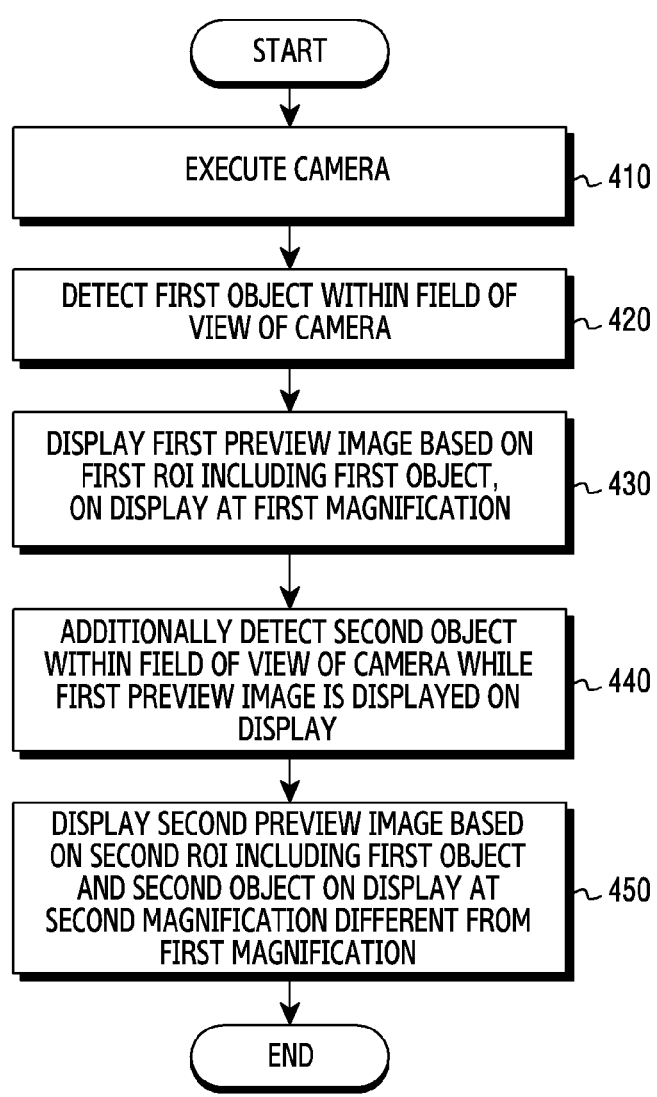
FIG. 4 illustrates a process of displaying a preview image when a plurality of objects are detected by an electronic device according to an embodiment.

FIG. 4 illustrates a process of displaying a preview image when a plurality of objects are detected by an electronic device according to an embodiment.

In operation 410 according to an embodiment, the processor 210 may execute the camera 220. For example, the processor 210 may execute the camera 220 in response to a user's input. The user's input may include at least one of a user's input by pressing a virtual capture button, a user's input by pressing a physical capture button, and a user's input using a voice recognition function.

In an embodiment, the processor 210 may acquire image data through an image sensor in the camera 220 by executing the camera 220. The image data may acquire various color values through a color filter array. The color filter array may include an RGB color filter array. The RGB is just an example, and the color filter array may include color filter arrays including a red, green, blue, emerald (RGBE) pattern, a cyan, yellow, magenta (CYYM) pattern, a cyan, yellow, green, magenta (CYGM) pattern, or a red, green, blue, white (RGBW) pattern.

In operation 420 according to an embodiment, the processor 210 may detect a first object within the field of view of the camera 220. The processor 210 may detect the first object by analyzing image data acquired through the camera 220. The processor 210 may detect the first object within the field of view of the camera 220, based on the acquired image data. For example, the processor 210 may detect the first object when the first object moves into the field of view of the camera 220. Alternatively, the processor 210 may detect the first object when the photographing direction of the camera 220 moves to the first object in a stationary state.

In operation 430 according to an embodiment, the processor 210 may display a first preview image based on a first region of interest (ROI) including the first object on the display 110 at a first magnification. The processor 210 may determine the first object region corresponding to the detected first object. The processor 210 may determine the first ROI, based on the first object region and display a first preview image of the first ROI on the display 110 at the first magnification. For example, when the first object at a first distance is detected, the processor 210 may display a preview image at the first magnification in order to magnify and display the first object.

In operation 440 according to an embodiment, the processor 210 may additionally detect the second object within the field of view of the camera 220 while the first preview image is displayed on the display 110. While the first preview image is displayed on the display 110, the processor 210 may additionally detect the second object, based on image data obtained through the camera 220. For example, when the second object enters the field of view of the camera 220, the processor 210 may detect the second object together with the first object.

In operation 450 according to an embodiment, the processor 210 may display a second preview image based on a second ROI including the first object and the second object on the display 110 at a second magnification different from the first magnification. The processor 210 may change the first ROI including the first object into the second ROI including the first object and the second object. The processor 210 may display a second preview image including the first object and the second object on the display 110, based on the second ROI including the first object and the second object.

In an embodiment, the processor 210 may display the second preview image on the display 110 at the second magnification different from the first magnification. For example, when the processor 210 additionally detects the second object while detecting the first object, the processor 210 may display the second preview image at the second magnification lower than the first magnification to display the preview image on the display 110 so as to include both the first object and the second object.

In an embodiment, the processor 210 may determine whether the detected first object and the detected second object are stable, and control a preview image, based on the determination. A process of determining whether an object is stable will be described with reference to FIG. 6A, and thus the determining process will be omitted in FIG. 4. For example, when two persons are within the field of view of the camera 220 and the two persons are included in a predefined region, the processor 210 may display a preview image, based thereon. When one of the two persons moves, the processor 210 may determine that one of the two persons is not stable and thus may not change the zoom, and when the one person is stable within the camera view angle other than the preview image, the processor 210 may change the region of interest such that the two people are included in the region of interest and may output a preview image, based the change. According to another example, when two persons are sitting and one of the two persons is standing up, the processor may determine that the one person is not stable while standing up, and thus may not change the zoom. When the processor 210 determines that the state of the two persons is stable because the one person has fully stood up, the processor 210 may change the region of interest such that both the two persons are included in the region of interest, and may output a preview image, based on the change. According to another example, when two people are sitting and one of the two people moves out of the field of view of the camera 220, the processor 210 may change the region of interest such that the sitting person is included in the region of interest, and may output a preview image, based on the region of interest. According another example, when two persons are sitting and both the two persons move out of a predefined region, the processor 210 may control the camera t zoom out.

Figure 5:
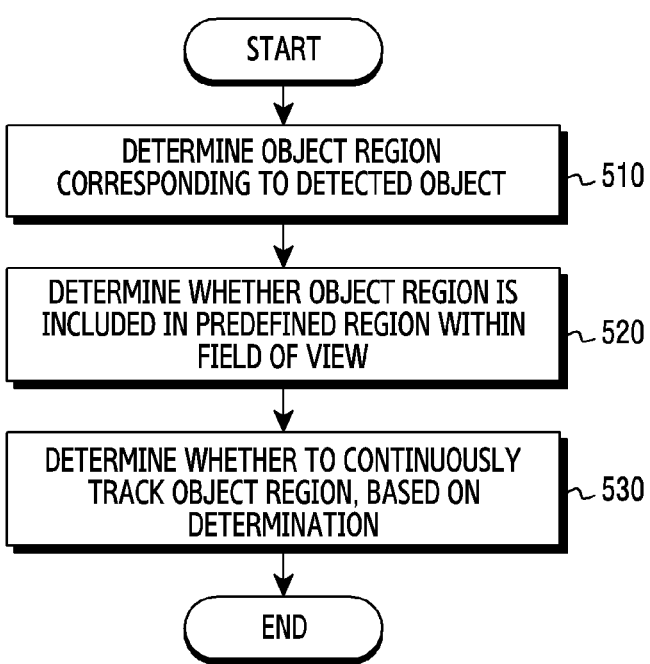
FIG. 5 illustrates a process of tracking an object region by an electronic device according to an embodiment.

FIG. 5 illustrates a process of tracking an object region by an electronic device according to an embodiment. A subject of operations of the flowchart illustrated in FIG. 5 may be understood as a processor (e.g., the processor 210 in FIG. 2 or an image signal processor).

In operation 510 according to an embodiment, the processor 210 may determine an object region corresponding to the detected object. The processor 210 may determine an object region corresponding to an object detected through the camera 220 and track the object region. The object region may include the detected object while including a margin region which is a region larger than the detected object. The processor 210 may include the margin region in the object region so as to ignore, when a motion of the object such as minute vibration is present, the motion, thereby preventing a preview image from shaking.

In operation 520 according to an embodiment, the processor 210 may determine whether the object region is included in a predefined region within the field of view. The processor 210 may determine whether the center point of the object region is included in the predefined region and the size of the object region is larger than a first size. For example, the processor 210 may determine whether the center point of the object region is within the range of about 70% of the field of view of the camera from the center thereof. However, the predefined region which is described to be within the range of about 70% of the field of view of the camera from the center thereof is only an example, and the predefined region may be variously defined within the range of about 50% to about 90% of the field of view of the camera from the center thereof.

In operation 530 according to an embodiment, the processor 210 may determine whether to continuously track the object region, based on the determination. The processor 210 may determine whether to continuously track the object region, based on the size and location of the object region. For example, the object region may be distorted when it is difficult to track an object region due to the small size thereof, or the location of the object region is close to the outer edge part of the field of view of the camera 220, and therefore, the processor 210 may stop tracking the object region.

In an embodiment, the processor 210 may continuously track and detect the object region when the center point of the object region is included in the predefined region and the size of the object region is greater than the first size. For example, the processor 210 may continuously track and detect the object region when the center point of the object region is within the range of about 70% of the field of view of the camera from the center thereof, and the size of the object region is greater than or equal to a predetermined size. However, the predefined region which is described to be within the range of about 70% of the field of view of the camera from the center thereof is only an example, and the predefined region may be variously defined within the range of about 50% to about 90% of the field of view of the camera from the center thereof.

In an embodiment, the processor 210 may not track the object region when the center point of the object region is not included in the predefined region or the size of the object region is smaller than the first size. For example, the processor 210 may stop tracking the object region when the center point of the object region is outside a 90% range of the field of view the camera 220 from the center thereof or the size of the object region is less than or equal to a predetermined size.

Figure 6A:
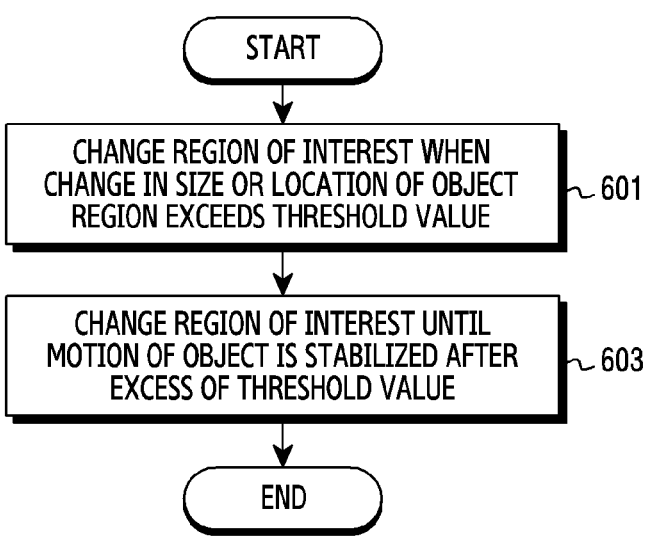
FIG. 6A illustrates a process of changing a region of interest according to the motion of an object when the number of objects detected by an electronic device is a first number (e.g., one) according to an embodiment.

FIG. 6A illustrates a process of changing a region of interest according to the motion of an object when the number of objects detected by the electronic device is a first number (e.g., one) according to an embodiment. A subject of operations of the flowchart illustrated in FIG. 6A may be understood as a processor (e.g., the processor 210 in FIG. 2 or an image signal processor).

In operation 601 according to an embodiment, the processor 210 may change the region of interest when a change in size or location of the object region exceeds a threshold value. The processor 210 may determine the region of interest, based on the object region, and may change the region of interest when there is a change in size and/or location of the object region. In other words, the processor

210 may compare the object region of an Mth frame with the object regions of an Nth frame, which is the frame after the Mth, to change the region of interest, based on the object region when the difference between the object regions is excessive (e.g., is greater than a threshold).

$$\frac{abs(RectCenterX - TargetRectCenterX)}{TargetRectDimX} > th_1 \text{ OR,}$$

$$\frac{abs(RectCenterY - TargetRectCenterY)}{TargetRectDimY} > th_2 \text{ OR,}$$

$$\frac{abs(RectDimX - TargetRectDimX)}{TargetRectDimX} > th_3 \text{ OR,}$$

$$\frac{abs(RectDimY - TargetRectDimY)}{TargetRectDimY} > th_4$$

The above formula is a decision logic for comparing object regions.

Referring to the above formula, the processor 210 may compare the center of the object region of the Mth frame and the center of the object region of the Nth frame. The processor 210 may compare the width of the object region of the Mth frame with the width of the object region of the Nth frame. The processor 210 may compare the height of the object region of the Mth frame with the height of the object region of the Nth frame. The formula is the "OR" condition, and when at least one condition is satisfied, the processor 210 may determine that the difference between the object region of the Mth frame and the object region of the Nth frame is excessive (e.g., is greater than a threshold), and thus change the region of interest. For example, the processor 210 may change the region of interest when there is a large motion, such as when a sitting person stands up, when a person spreads his/her arms to the sides in a static posture, or when a person walks.

In an embodiment, the processor 210 may determine whether a size change or location change of the object region exceeds a threshold value, based on the size of the object region. In other words, in a case where the object region moves by a first number of pixels, the region of interest may be maintained when the object region is of the first size, and the region of interest may be changed when the object region is of a second size smaller than the first size. For example, in a case where the width of the object region is "w", the height of the object region is "h", and the center of the object region of the Mth frame and the center of the object region of the (M+1)th frame are different by (x, y), when x/w is greater than a first value or when y/h is greater than a second value, the processor 210 may determine that the size change or location change of the object region exceeds a threshold value.

In operation 603 according to an embodiment, the processor 210 may change the region of interest until the motion of the object is stabilized after exceeding the threshold value.

In an embodiment, the processor 210 may determine whether the motion of the object is stable.

MAX(abs(average(ΔcenterX)),abs(average(ΔcenterY)), abs(average(Δw)), abs(average(Δh))<th The above formula is a decision logic for determining whether the motion of the object is stable. The processor 210 may determine whether the motion of the object is stable, based on changes in the center point, width, and height of the object region. When the processor 210 determines that the motion of the object is not stable, the processor 210 may change the region of interest until the motion of the object is stable.

In an embodiment, the processor 210 may display a preview image on the display 110, based on the region of interest. The processor 210 may determine the region of interest as a preview region and display a preview image, based on the determined preview region. When the region of interest is changed, the processor 210 may determine a preview region, based on the changed region of interest and display a preview image, based on the determined preview region. A description related to this may be explained with reference to FIG. 7 below.

Figure 6B:
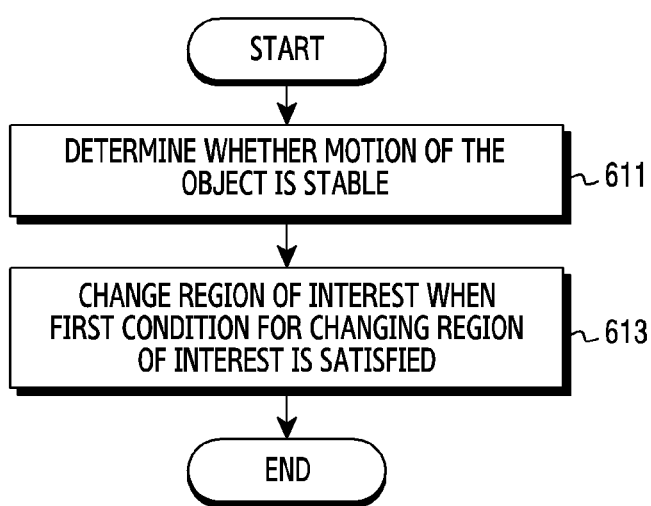
FIG. 6B illustrates a process of changing a region of interest according to the motion of an object when the number of objects detected by the electronic device is a second number (e.g., two) according to an embodiment.

FIG. 6B illustrates a process of changing a region of interest according to the motion of an object when the number of objects detected by an electronic device is a second number (e.g., two) according to an embodiment. However, the example of the second number is only an example of an embodiment, and the application of the embodiment of FIG. 6B may be extended to three or more. A subject of operations of the flowchart illustrated in FIG. 6B may be understood as a processor (e.g., the processor 210 in FIG. 2 or an image signal processor).

In operation 611 according to an embodiment, the processor 210 may determine whether the motion of the object is stable. The processor 210 may determine whether the motions of a second number (e.g., two) of detected objects are stable. The logic for determining whether the motion of the object is stable may be applied to the contents of operation 603 in FIG. 6A.

In operation 613 according to an embodiment, the processor 210 may change the region of interest when the first condition for changing the region of interest is satisfied. After determining that the motion of the second number (e.g., two) of objects is stable, the processor 210 may determine whether the first condition for changing the region of interest is satisfied. The first condition may be applied when at least two objects are included. The first condition will be explained through several examples as follows.

In an embodiment, the processor 210 may change the region of interest when the first condition is satisfied when one of two or more objects is outside the current preview image.

In an embodiment, the first condition is satisfied when at least two objects are present in the preview image and the change in the motion or size thereof is excessive (e.g., is greater than a threshold), and thus the processor 210 may change the region of interest. For example, the processor 210 may compare the object region of the Mth frame with the object regions of the Nth frame, which is the frame after the Mth, and when difference between the object regions is excessive (e.g., is greater than a threshold), the processor 201 may change the region of interest, based on the object region. Accordingly, the determination logic for comparing the object regions may be applied to operation 601. For example, when two persons who have sat still in the current preview image stand up such that their heads are out of the field of view and the motions of the two persons become stable, the processor 210 may change the region of interest. As another example, in a case where two person who have stood still sit down and the motions thereof become stable, when the change in the motion or size of the two persons is excessive (e.g., is greater than a threshold), the processor 210 may change the region of interest.

In an embodiment, the first condition is satisfied when the object is not included in the current preview image, and thus the processor 210 may change the region of interest to the maximum zoom-out region.

In an embodiment, when the first condition for changing the region of interest is not satisfied, the processor 210 does not need to further change the region of interest and may display a preview image, based on the region of interest. When the first condition for changing the region of interest is satisfied, the processor 210 may change the region of interest and display a preview image on the display 110, based on the changed region of interest. A description related to this may be explained with reference to FIG. 7 below.

Figure 7:
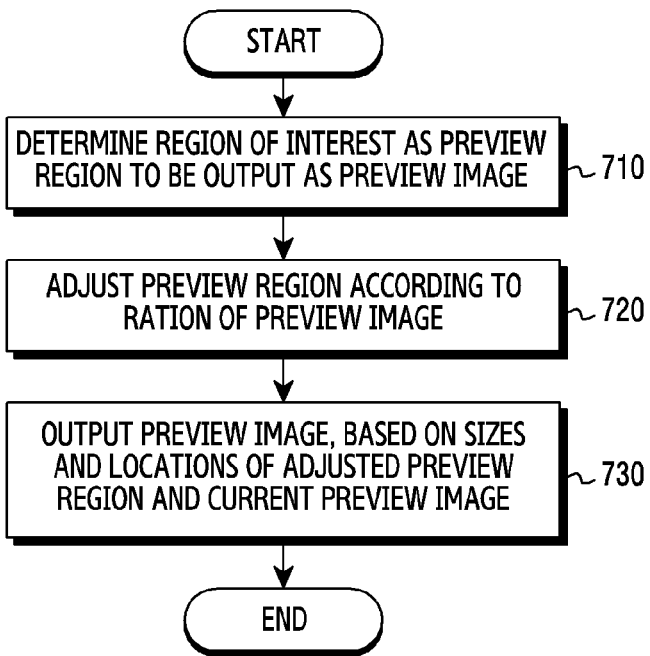
FIG. 7 illustrates a process of determining a preview region and outputting a preview image by an electronic device according to an embodiment.

FIG. 7 illustrates a process of determining a preview region and outputting a preview image by an electronic device according to an embodiment. A subject of operations of the flowchart illustrated in FIG. 7 may be understood as a processor (e.g., the processor 210 in FIG. 2 or an image signal processor).

In operation 710 according to an embodiment, the processor 210 may determine the region of interest as a preview region to be output as a preview image. The processor 210 may determine a preview region of each frame, based on the region of interest of each frame. When the region of interest is changed by operations 601 and 603 in FIG. 6A and/or operation 613 in FIG. 6B, the processor 210 may determine the changed region of interest as a preview region.

In operation 720 according to an embodiment, the processor 210 may adjust the preview region according to the ratio of the preview image. The processor 210 may adjust the preview region, based on the size of the resolution for outputting the preview image. For example, when the configured size of the preview region is 1:1 and the size of the resolution for outputting the preview image is 16:9, the processor 210 may change the configured size of the preview region to 16:9.

In operation 730 according to an embodiment, the processor 210 may output a preview image, based on the sizes and locations of the adjusted preview region and the current preview image.

In an embodiment, the processor 210 may output a new preview image by comparing the location of the currently displayed preview image with the location of the preview region to be displayed as a preview image. When the coordinates of the center point of the first preview image being displayed on the display 110 in the Mth frame are (a, x) and the coordinates of the center point of the preview region in the (M+1)th frame are (b, y), the coordinates of the center point of the second preview image in the (M+1)th frame may be ((a+b)/2, (x+y)/2) between the first preview image and the preview region. For example, when the coordinates of the center point of the preview image being displayed on the display 110 in the Mth frame are (11, 11) and the coordinates of the center point of the preview region in the (M+1)th frame are (19, 19), the processor 210 may display, on the display 210, a preview image, the coordinates of the center point of which are (15, 15) in the (M+1)th frame.

In an embodiment, the processor 210 may output a new preview image by comparing the size of the currently displayed preview image with the size of a preview region to be displayed as a preview image. In the processor 210, when the width and height of the first preview image being displayed on the display 110 in the Mth frame are (A, X), and the width and height of the preview region in the (M+1)th frame are (B, Y), the width and height of the second preview image in the (M+1)th frame may be ((A+B)/2, (X+Y)/2).

In an embodiment, the processor 210 may determine a variance of the ratio and the maximum movement distance of a preview region to be output.

$$NextCenter = \frac{dist}{|\vec{ab}|}\vec{ab}\left(\vec{a}: \text{center of current view}, \vec{b}: \text{center of Target } Rect\right)$$

$$dist = \begin{cases} d_1 & \text{if } d_1 < |\vec{ab}| \\ |\vec{ab}|, & \text{else} \end{cases}$$

$$NextRectSize = \text{ratio} \times CurrentRectSize$$

$$ratio = \begin{cases} 1 + r1, & 1 < 1 + r1 < \dfrac{TargetRectSize}{CurrentRectSize} \\ 1 - r1 & \dfrac{TargetRectSize}{CurrentRectSize} < 1 - r1 < 1 \\ \dfrac{TargetRectSize}{CurrentRectSize}, & \text{else} \end{cases}$$

The above formula is a formula for the ratio and the maximum movement distance movable at one time in each frame. The processor 210 may determine a variance of the ratio and the maximum movement distance of the preview region, and the preview region may be controlled up to the determined variance of the ratio and maximum movement distance when there is a motion exceeding the determined change.

In an embodiment, the processor 210 may control the variance of the ratio and the maximum movement distance of the preview region to be output. When the movement and the enlargement/reduction of the preview region are performed independently, an unnatural change in the preview image may appear because, from the time point at which either the zoom magnification change or the screen movement is completed, the motion of the other appears. Accordingly, the processor 210 may adaptively apply a distance moved at one time and an enlargement/reduction ratio so that the zoom magnification change and the screen movement may be completed simultaneously.

In an embodiment, the processor 210 may gradually increase the maximum movement distance when the detected object moves rapidly and the variance is thus large. The processor 210 may gradually decrease the maximum movement distance when the detected object moves slowly and the variance is thus small. This may also be equally applied to the control of the amount of change in the ratio.

Figure 8:
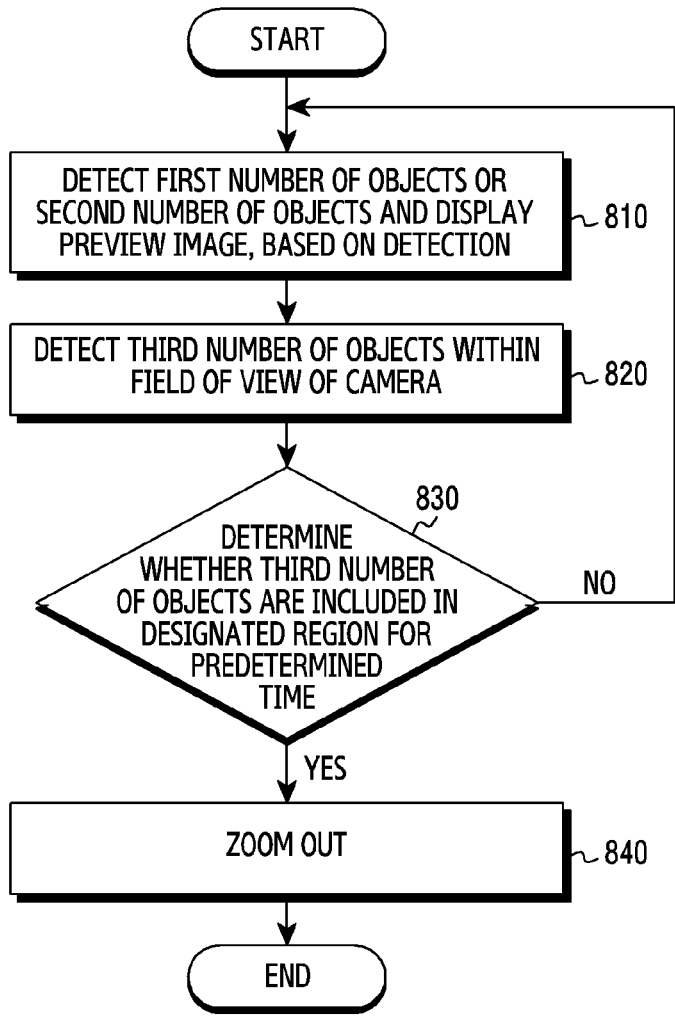
FIG. 8 illustrates controlling a preview image when at least three objects are detected by an electronic device according to an embodiment.

FIG. 8 illustrates controlling a preview image when at least three objects are detected by an electronic device according to an embodiment. A subject of operations of the flowchart illustrated in FIG. 8 may be understood as a processor (e.g., the processor 210 in FIG. 2 or an image signal processor).

In operation 810 according to an embodiment, the processor 210 may detect a first number (e.g., one) of objects or a second number (e.g., two) of objects and display a preview image, based on the detection. The description in which the processor 210 detects the first number (e.g., one) of objects and displays the preview image, based on the detection may be explained by operation 420 in FIG. 4 and/or operation 430 in FIG. 4. The description in which the processor 210 detects the second number (e.g., two) of objects and displays the preview image, based on the detection may be explained by operation 440 in FIG. 4 and/or operation 450 in FIG. 4.

In operation 820 according to an embodiment, the processor 210 may detect a third number (e.g., three or more) of objects within the field of view of the camera 220. For example, while the processor 210 detects one object and displays a preview image, based on the detection, the processor 210 may additionally detect at least two objects. For another example, while the processor 210 detects two objects and displays a preview image, based on the detection, the processor 210 may additionally detect at least one object.

In operation 830 according to an embodiment, the processor 210 may determine whether the third number (e.g., three or more) of objects are included in the designated region for a predetermined time. The processor 210 may determine whether the central points of the third number (e.g., three) of objects are included in the designated region of the image for a predetermined time. In other words, the processor 210 may determine the locations of the central points of the third number (e.g., three) of objects for a predetermined time in order to determine whether the third detected object is valid for a region of interest. The predetermined time may be calculated in the unit of seconds or in the unit of frames.

In operation 840 according to an embodiment, the processor 210 may perform a zooming out within the field of view range of the camera. For example, the processor 210 may display the preview image at a basic magnification (e.g., ×1.0). The above example may be equally applied even when the electronic device 100 includes at least one of a standard camera, a telephoto camera, a wide camera, and an ultra-wide camera.

In an embodiment, the processor 210 may determine a magnification for zooming out according to a user's configuration when a zooming out is performed within the field of view range of the camera. For example, in response to the user's configuration in which a preview image is displayed at a magnification of ×0.8 when the third number (e.g., three or more) of objects are detected, the processor 210 may display the preview image on the display 110 at a magnification of ×0.8 when at least three objects are detected.

In an embodiment, when the third number (e.g., three or more) of objects is detected, the processor 210 may control the camera to zoom out while performing control such that the center of the region of interest including the third number (e.g., three or more) of objects corresponds to the center of the preview image.

Figure 9:
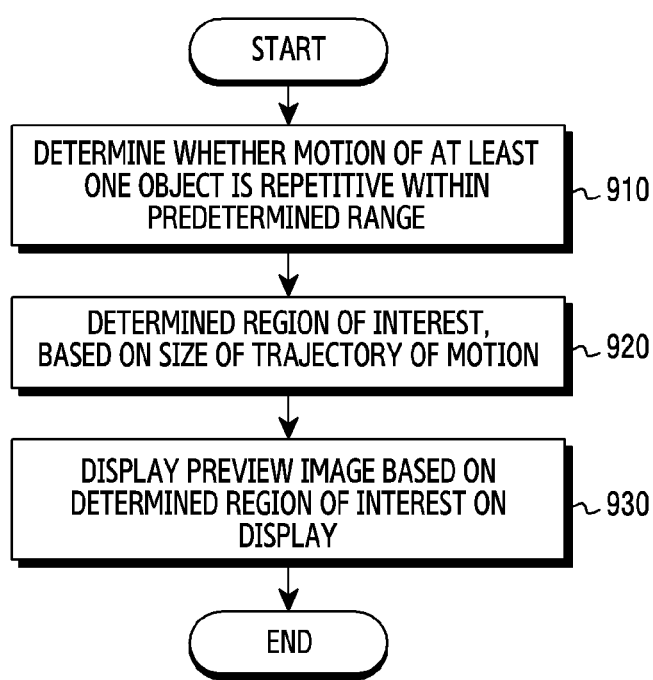
FIG. 9 illustrates processing when an object having a repetitive motion is detected in an electronic device according to an embodiment.

FIG. 9 illustrates processing when an object having a repetitive motion is detected in an electronic device according to an embodiment. A subject of operations of the flowchart illustrated in FIG. 9 may be understood as a processor (e.g., the processor 210 in FIG. 2) or an image signal processor).

In operation 910 according to an embodiment, the processor 210 may determine whether the motion of at least one object is repetitive within a predetermined range. The processor 210 may detect at least one object and determine whether the motion of the object is repetitive for a predetermined time. For example, when the motion of the object moves from a first location to a second location and the movement from the second location to the first location are repeated for a predetermined time, the processor 210 may determine that the motion of the object is repetitive. The motion may include not only linear motion, but also other motions including, but not limited to, a curved motion and a circular motion.

In operation 920 according to an embodiment, the processor 210 may configure a region of interest, based on the size of a trajectory of the motion. The processor 210 may configure, as a region of interest, a region including a trajectory of an object's motion. For example, when the object moves from the first location to the second location and the movement from the second location to the first location is repetitive, the processor 210 may configure, as a region of interest, a region including the first object at the first location, the first object at the second location, and the first object in the movement path.

In operation 930 according to an embodiment, the processor 210 may display a preview image based on the determined region of interest on the display 110. The descriptions given in FIGS. 4, 6A, 6B, and 7 may be applied identically or similarly to the operation of displaying a preview image, based on the determined region of interest.

Figure 10:
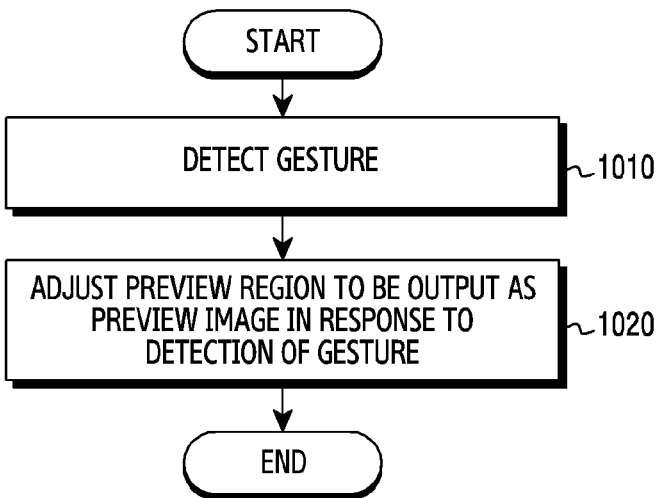
FIG. 10 illustrates preview processing when a specific gesture is detected by an electronic device according to an embodiment.

FIG. 10 illustrates preview processing when a specific gesture is detected by an electronic device according to an embodiment. A subject of operations of the flowchart illustrated in FIG. 10 may be understood as a processor (e.g., the processor 210 in FIG. 2 or an image signal processor).

In operation 1010 according to an embodiment, the processor 210 may detect a specific gesture. The processor 210 may detect a specific gesture by analyzing image data acquired through the camera 220.

In an embodiment, the processor 210 may determine whether the detected gesture is a valid gesture. The processor 210 may determine that the gesture is valid when the detected gesture is less than or equal to a predetermined variance, compared with the previous frame. For example, the processor 210 may determine that the gesture is valid when the variance of the object region corresponding to the detected gesture is smaller than the N pixels. When the detected gesture lasts for a predetermined time compared with the previous frame, the processor 210 may determine that the gesture is valid. For example, the processor 210 may determine that the gesture is valid when the gesture lasts for M seconds or longer. When the gesture should not be detected immediately after determining that the gesture is valid, the processor 201 may initialize the duration of the gesture up to a predetermined time or less.

In an embodiment, the processor 210 may detect the type of gesture without processing all input image data. The processor 210 may detect a gesture by processing only N to M frames per second among input image data. For example, N may be 5 and M may be 30. It should be appreciated that other values of N and M may be used without departing from the scope of the invention.

In an embodiment, the processor 210 may identify whether the specific gesture corresponds to a gesture previously stored in the memory 230. The gestures previously stored in the memory 230 may be deleted, added, or changed according to user configuration. The processor 210 may perform operation 1020 when the specific gesture corresponds to a gesture previously stored in the memory 230.

In operation 1020 according to an embodiment, the processor 210 may adjust a preview region to be output as a preview image in response to detection of the gesture. When the detected gesture corresponds to the gesture previously stored in the memory 230, the processor 210 may control the preview image in response to the detected gesture. For example, when a gesture of clenching the user's fist is detected, the processor 210 may perform control such that the zoom magnification of the camera 220 decreases in response to information on the gesture of clenching a fist. For another example, when a gesture of opening the user's fist is detected, the processor 210 may perform control such that the zoom magnification of the camera 220 increases in response to information on the gesture of opening a fist. For another example, when a gesture of pointing to a specific location with the user's finger or palm, the processor 210 may change the preview image to be at the specific location in response to information on the gesture of pointing to a specific location.

Figure 11:
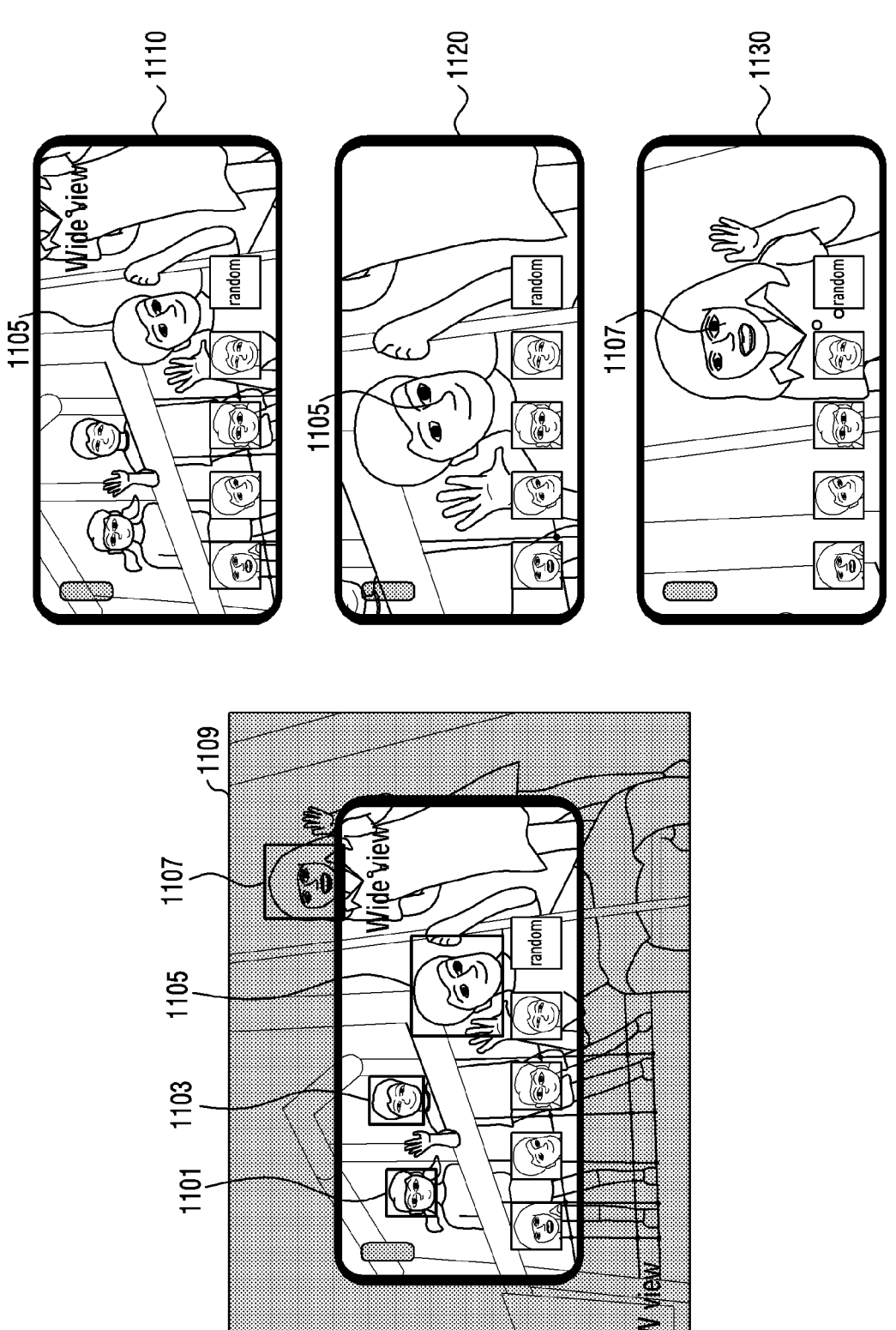
FIG. 11 illustrates a user interface according to object selection by an electronic device according to an embodiment.

FIG. 11 illustrates a user interface according to object selection by an electronic device according to an embodiment.

Referring to FIG. 11, the processor 210 may display, on one region of the display 110, an icon for selecting an object detected through the camera 220 and/or a random icon randomly showing an object. The processor 210 may obtain a user's input received through the display 110. The processor 210 may display an object corresponding to the user's input on the display 110 in response to the user's input received through the display 110. An image 1109 may be an image corresponding to a field of view of an ultra-wide-angle camera. A first preview image 1110 may be an image corresponding to a field of view of a wide-angle camera. A first object 1101, a second object 1103, a third object 1105, and a fourth object 1107 may be included in the field of view of the ultra-wide-angle camera. The first object 1101, the second object 1103, and the third object 1105 may be included in the field of view of the wide-angle camera.

In an embodiment, the second preview image 1120 may be an image displaying the third object 1105 in response to a user's input for selecting the third object 1105. The third preview image 1130 may be an image displaying the fourth object 1107 in response to a user's input for selecting the fourth object 1107.

Figure 12:
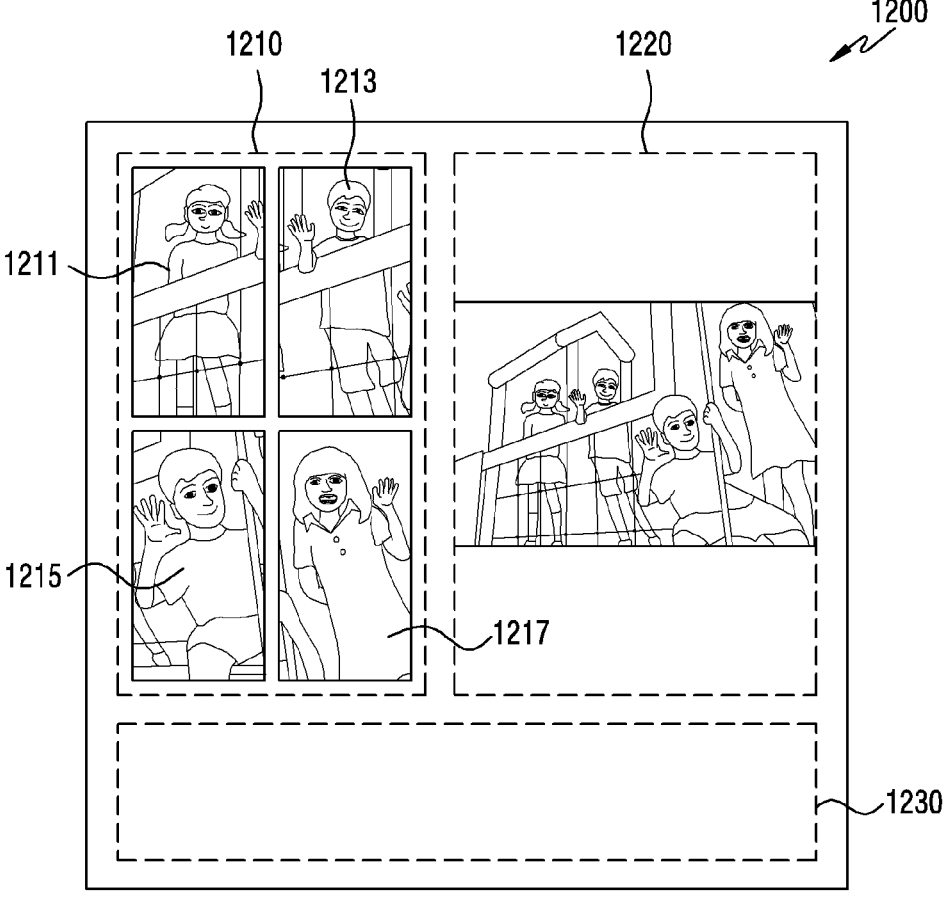
FIG. 12 illustrates displaying a user interface for each region of a display by an electronic device according to an embodiment.

FIG. 12 illustrates displaying a user interface for each region of a display by an electronic device according to an embodiment.

Referring to FIG. 12, a display 1200 may be a flexible display or a rollable display. The display 1200 may include a first region 1210, a second region 1220, and a third region 1230. The processor 210 may provide various user interfaces through the first region 1210 to the third region 1230. Locations of the first region 1210 to the third region 1230 are not limited. The first region 1210 to the third region 1230 may have various sizes. Locations and/or sizes of the first region 1210 to the third region 1230 may be changed according to user configurations.

In an embodiment, the processor 210 may display at least one object detected through the first region 1210 of the display 1200. The processor 210 may display an object such as a person and/or an object being detected through the first region 1210. For example, the processor 210 may display the first object 1211, the second object 1213, the third object 1215, and the fourth object 1217 which are being detected through the first area 1210, respectively.

In an embodiment, the processor 210 may display a preview image having a zoom magnification adjusted based on a plurality of objects, through the second region 1220 of the display 1200. For example, the processor 210 may determine a region of interest including a plurality of objects and adjust a zoom magnification, based on the region of interest, to display a preview image.

In an embodiment, the processor 210 may display a user interface related to photography through the third region 1230 of the display 1200. For example, the third region 1230 may display various user interfaces such as a photographing button, a camera switching button, and a camera mode changing button.

Figure 13:
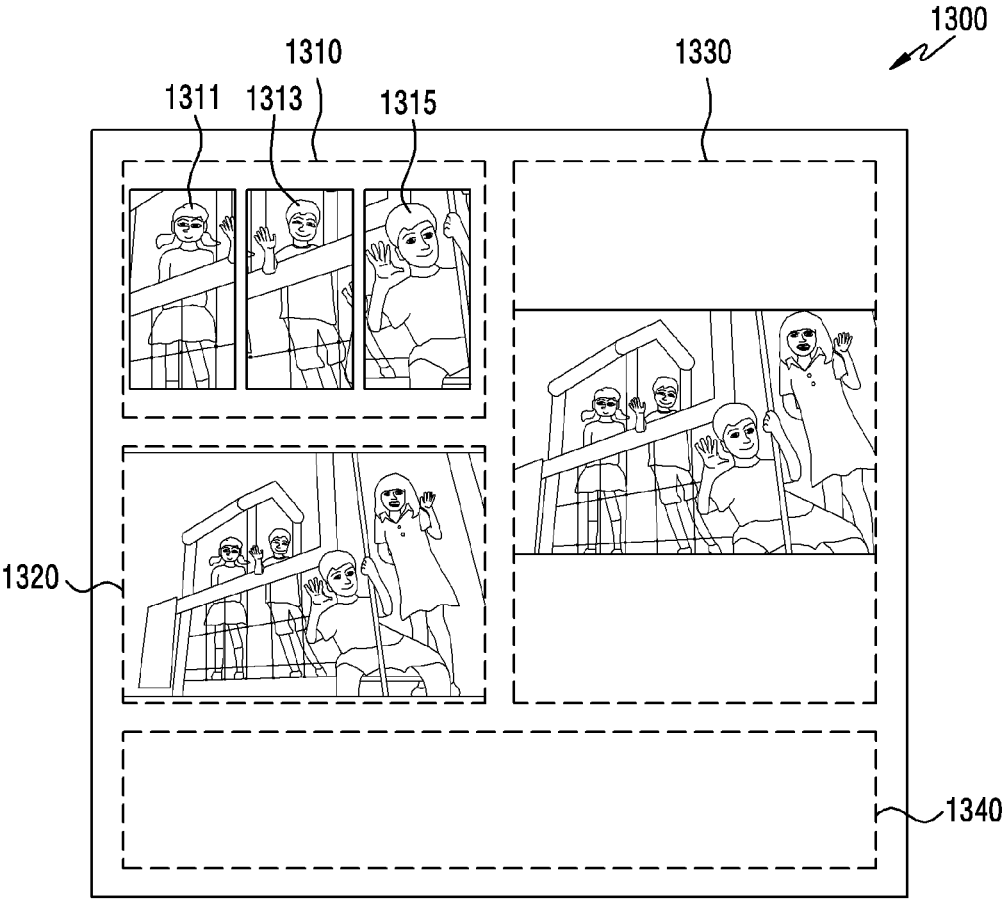
FIG. 13 illustrates displaying a user interface for each region of a display by an electronic device according to an embodiment.

FIG. 13 illustrates displaying a user interface for each region of a display by an electronic device according to an embodiment.

Referring to FIG. 13, a display 1300 may be a flexible display or a rollable display. The display 1300 may include at least one of a first region 1310, a second region 1320, a third region 1330, and a fourth region 1340. The processor 210 may provide various user interfaces through the first region 1310 to the fourth region 1340. Locations of the first region 1310 to the fourth region 1340 are not limited. The first region 1310 to the fourth region 1340 may have various sizes. Locations and/or sizes of the first region 1310 to the fourth region 1340 may be changed according to user configurations.

In an embodiment, the processor 210 may display at least one object detected through the first region 1310 of the display 1300. The processor 210 may display an object such as a person and/or object being detected through the first region 1310. For example, the processor 210 may display the first object 1311, the second object 1313, and the third object 1315 which are being detected through the first region 1310, respectively.

In an embodiment, the processor 210 may display image, as a preview image, image data acquired through the camera 220 via the second region 1320 of the display 1300. For example, the processor 210 may display an image captured within the field of view of the camera 220 through the second region 1320.

In an embodiment, the processor 210 may display a preview image having a zoom magnification adjusted based on a plurality of objects, through the third region 1330 of the display 1300. For example, the processor 210 may determine a region of interest including all the plurality of objects and adjust a zoom magnification, based on the region of interest, to display a preview image.

In an embodiment, the processor 210 may display a user interface related to photography through the fourth region 1340 of the display 1300. For example, the fourth region 1340 may display various user interfaces such as a photographing button, a camera switching button, and a camera mode changing button.

Figure 14:
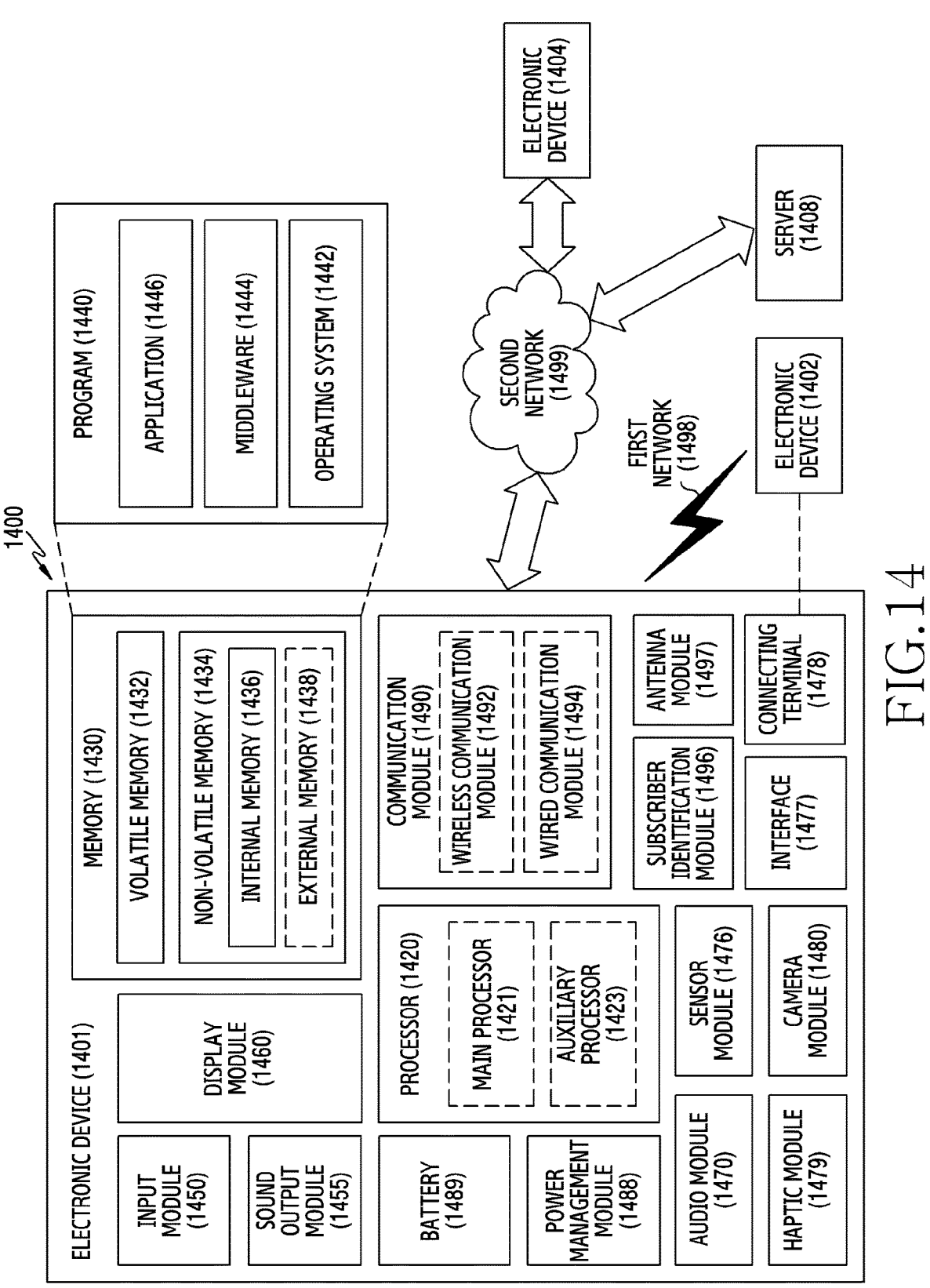
FIG. 14 is a block diagram of an electronic device in a network environment according to various embodiments.

FIG. 14 is a block diagram illustrating an electronic device 1401 in a network environment 1400 according to various embodiments.

Referring to FIG. 14, the electronic device 1401 in the network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program

1440) and input data or output data for a command related thererto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 15:
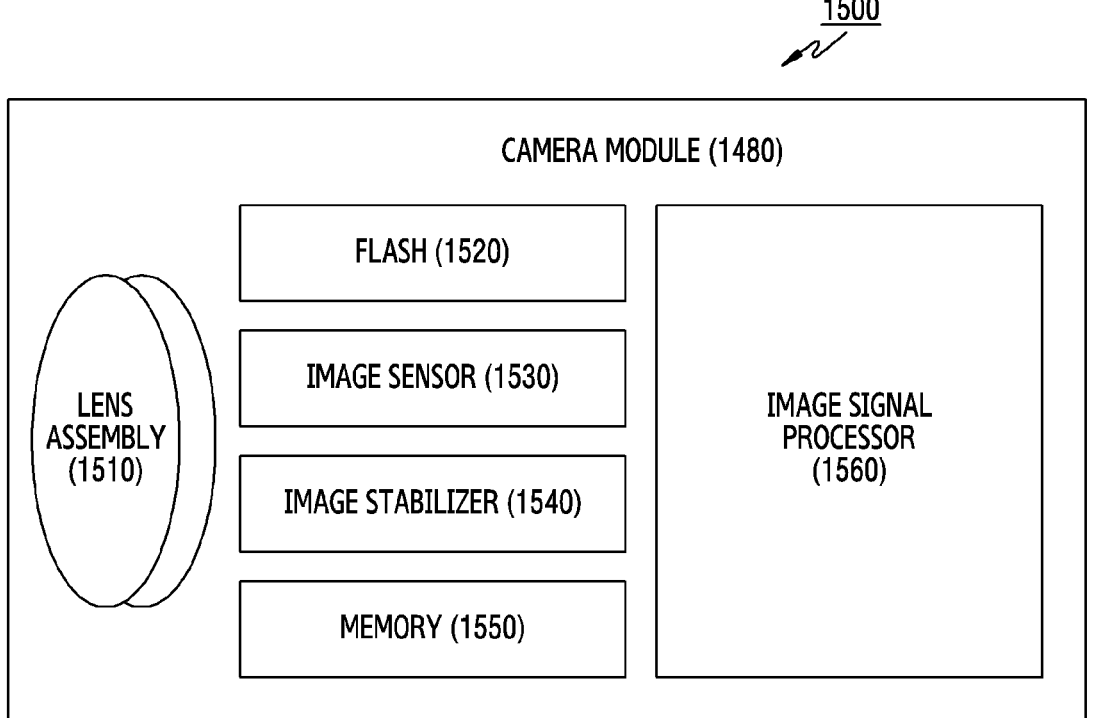
FIG. 15 is a block diagram illustrating a camera module according to various embodiments.

FIG. 15 is a block diagram 1500 illustrating the camera module 1480 according to various embodiments. Referring to FIG. 15 the camera module 1480 may include a lens assembly 1510, a flash 1520, an image sensor 1530, an image stabilizer 1540, memory 1550 (e.g., buffer memory), or an image signal processor 1560. The lens assembly 1510 may collect light emitted or reflected from an object whose image is to be taken. The lens assembly 1510 may include one or more lenses. According to an embodiment, the camera module 1480 may include a plurality of lens assemblies 1510. In such a case, the camera module 1480 may form, for example, a dual camera, a 360-degree camera, or a spherical camera. Some of the plurality of lens assemblies 1510 may have the same lens attribute (e.g., view angle, focal length, auto-focusing, f number, or optical zoom), or at least one lens assembly may have one or more lens attributes different from those of another lens assembly. The lens assembly 1510 may include, for example, a wide-angle lens or a telephoto lens.

The flash 1520 may emit light that is used to reinforce light reflected from an object. According to an embodiment, the flash 1520 may include one or more light emitting diodes (LEDs) (e.g., a red-green-blue (RGB) LED, a white LED, an infrared (IR) LED, or an ultraviolet (UV) LED) or a xenon lamp. The image sensor 1530 may obtain an image corresponding to an object by converting light emitted or reflected from the object and transmitted via the lens assembly 1510 into an electrical signal. According to an embodiment, the image sensor 1530 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1530 may be implemented using, for example, a charged coupled device (CCD) sensor or a complementary metal oxide semiconductor (CMOS) sensor.

The image stabilizer 1540 may move the image sensor 1530 or at least one lens included in the lens assembly 1510 in a particular direction, or control an operational attribute (e.g., adjust the read-out timing) of the image sensor 1530 in response to the movement of the camera module 1480 or the electronic device 1401 including the camera module 1480. This allows compensating for at least part of a negative effect (e.g., image blurring) by the movement on an image being captured. According to an embodiment, the image stabilizer 1540 may sense such a movement by the camera module 1480 or the electronic device 1401 using a gyro sensor (not shown) or an acceleration sensor (not shown) disposed inside or outside the camera module 1480. According to an embodiment, the image stabilizer 1540 may be implemented, for example, as an optical image stabilizer. The memory 1550 may store, at least temporarily, at least part of an image obtained via the image sensor 1530 for a subsequent image processing task. For example, if image capturing is delayed due to shutter lag or multiple images are quickly captured, a raw image obtained (e.g., a Bayer-patterned image, a high-resolution image) may be stored in the memory 1550, and its corresponding copy image (e.g., a low-resolution image) may be previewed via the display module 1460. Thereafter, if a specified condition is met (e.g., by a user's input or system command), at least part of the raw image stored in the memory 1550 may be obtained and processed, for example, by the image signal processor 1560. According to an embodiment, the memory 1550 may be configured as at least part of the memory 1430 or as a separate memory that is operated independently from the memory 1430.

The image signal processor 1560 may perform one or more image processing with respect to an image obtained via the image sensor 1530 or an image stored in the memory 1550. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1560 may perform control (e.g., exposure time control or read-out timing control) with respect to at least one (e.g., the image sensor 1530) of the components included in the camera module 1480. An image processed by the image signal processor 1560 may be stored back in the memory 1550 for further processing, or may be provided to an external component (e.g., the memory 1430, the display module 1460, the electronic device 1402, the electronic device 1404, or the server 1408) outside the camera module 1480. According to an embodiment, the image signal processor 1560 may be configured as at least part of the processor 1420, or as a separate processor that is operated independently from the processor 1420. If the image signal processor 1560 is configured as a separate processor from the processor 1420, at least one image processed by the image signal processor 1560 may be displayed, by the processor 1420, via the display module 1460 as it is or after being further processed.

According to an embodiment, the electronic device 1401 may include a plurality of camera modules 1480 having different attributes or functions. In such a case, at least one of the plurality of camera modules 1480 may form, for example, a wide-angle camera and at least another of the plurality of camera modules 1480 may form a telephoto camera. Similarly, at least one of the plurality of camera modules 1480 may form, for example, a front camera and at least another of the plurality of camera modules 1480 may form a rear camera.

In various embodiments, the electronic device 100 may include a camera 220, a display 110, and at least one processor (e.g., the processor 210 in FIG. 2) electrically connected to the camera 220 and the display 110.

In an embodiment, the at least one processor (e.g., the processor 210 in FIG. 2) may be configured to: execute the camera 220; detect a first object within a field of view (FOV) of the camera; display a first preview image based on a first region of interest (ROI) including the first object on the display 110 at a first magnification; additionally detect a second object within the FOV while the first preview image is displayed on the display 110; and display a second preview image based on a second ROI including the first object and the second object on the display 110 at a second magnification different from the first magnification.

In an embodiment, the at least one processor (e.g., the processor 210 in FIG. 2) may display a preview image based on the second ROI including the first object and the second object on the display 110 in case that a motion of the first object and a motion of the second object are stable.

In an embodiment, the at least one processor (e.g., the processor 210 in FIG. 2) may track at least one object in case that the center of at least one object region of a first object region corresponding to the first object and a second object region corresponding to the second object is included in a predefined region within the FOV.

In an embodiment, the at least one processor (e.g., the processor 210 in FIG. 2) may be configured to: additionally detect a third object within the FOV; and perform a zooming out to display a third preview image in case that the third object is included in a predefined region.

In an embodiment, the at least one processor (e.g., the processor 210 in FIG. 2) may display a preview image, based on the first object and the second object, in case that the additionally detected third object is not included in the predefined region for a predetermined time.

In an embodiment, the at least one processor (e.g., the processor 210 in FIG. 2) may be configured to: determine whether a motion of at least one object is repetitive within a predetermined range; determine a region of interest, based on the size of the trajectory of the motion; and display a preview image based on the determined region of interest on the display.

In an embodiment, in case that at least one of the first object and the second object is out of the FOV of the camera, the at least one processor (e.g., the processor 210 in FIG. 2) may display a fourth preview image, based on the remaining object excluding the object which is out of the FOV.

In an embodiment, in case that a specific gesture is detected, the at least one processor (e.g., the processor 210 in FIG. 2) may adjust a region to be output as a preview image, in response to the gesture.

In an embodiment, the at least one processor (e.g., the processor 210 in FIG. 2) may be configured to: display a second preview image based on the second ROI in a first region of the display; and display an image of the detected first object and an image of the detected second object in a second region of the display.

In an embodiment, the at least one processor (e.g., the processor 210 in FIG. 2) may compare a third object region corresponding to an object detected in an Mth frame and a fourth region corresponding to an object detected in an Nth frame, which is a frame after the Mth frame. The at least one processor (e.g., the processor 210 in FIG. 2) may change a region of interest in case that at least one of a variance of a size of the object region and a variance of a location of the object region is greater than or equal to a threshold value, based on the comparison.

In various embodiments, a method for operating the electronic device 100 may include: executing a camera 220; detecting a first object within a field of view (FOV) of the camera; displaying a first preview image based on a first region of interest (ROI) including the first object on a display 110 at a first magnification; additionally detecting a second object within the FOV while the first preview image is displayed on the display 110; and displaying a second preview image based on a second ROI including the first object and the second object on the display 110 at a second magnification different from the first magnification.

In an embodiment, in case that a motion of the first object and a motion of the second object are stable, the method for operating the electronic device 100 may include displaying, on the display, a preview image based on the second ROI including the first object and the second object.

In an embodiment, the method for operating the electronic device 100 may include tracking at least one object in case that the center of at least one object region of a first object region corresponding to the first object and a second object region corresponding to the second object is included in a predefined region within the FOV.

In an embodiment, the method for operating the electronic device 100 may include: determining whether a motion of at least one object is repetitive within a predetermined range; determining a region of interest, based on the size of a trajectory of the motion; and displaying a preview image based on the determined region of interest on the display 110.

In an embodiment, in case that at least one of the first object and the second object is out of the FOV of the camera 220, the method for operating the electronic device 100 may include displaying a fourth preview image, based on the remaining object excluding the object which is out of the FOV.

In an embodiment, the method for operating the electronic device 100 may include: comparing a third object region corresponding to an object detected in an Mth frame and a fourth region corresponding to an object detected in an Nth frame, which is a frame after the Mth frame; and changing a region of interest in case that at least one of a variance of a size of the object region and a variance of a location of the object region is greater than or equal to a threshold value, based on the comparison.

In various embodiments, the at least one processor (e.g., the processor 210 in FIG. 2) may be configured to: detect a first object in an Mth frame, based on image data acquired through the camera 220; determine whether a first object region corresponding to the first object is included in a predefined region; track the first object region in case that the first object region is included in the predefined region; determine a first ROI, based on the tracked first object region; display a first preview image on the display 110 at a first magnification, based on the determined first ROI; in case that a second object is additionally detected in an Nth frame, which is a frame after the Mth, determine whether a second object region corresponding to the second object is included in the predefined region; track the second object region in case that the second object region is included in the predefined region; determine a second ROI including the tracked first object region and the tracked second object region; and display a second preview image based on the determined second ROI on the display 110 at a second magnification different from the first magnification.

In an embodiment, the at least one processor (e.g., the processor 210 in FIG. 2) may be configured to: additionally detect a third object within the FOV; and perform a zooming out to display a third preview image in case that the third object is included in a predefined region.

In an embodiment, the at least one processor (e.g., the processor 210 in FIG. 2) may be configured to: determine whether a motion of at least one object is repetitive within a predetermined range; determine a region of interest, based on the size of a trajectory of the motion; and display a preview image based on the determined region of interest on the display 110.

In an embodiment, the at least one processor (e.g., the processor 210 in FIG. 2) may be configured to display a second preview image based on the second ROI in a first region of the display 110; display an image of the detected first object and an image of the detected second object in a second region of the display 110; and display image data acquired through the camera 220 as a preview image in a third region of the display 110 at a basic magnification.

The invention claimed is:

1. An electronic device comprising:
   a camera;
   a display;
   memory, comprising one or more storage media, storing instructions; and
   at least one processor communicatively connected to the camera, the display and the memory,
   wherein the instructions, when executed by the at least one processor individually or collectively, cause the electronic device to:
   execute the camera;
   detect a first object within a field of view (FOV) of the camera;
   acquire a first preview image based on a first region of interest (ROI) comprising the first object on the display at a first magnification;
   additionally detect a second object within the FOV while the first preview image is displayed on the display; and acquire a second preview image based on a second ROI comprising the first object and the second object on the display at a second magnification different from the first magnification.

2. The electronic device of claim 1, wherein the instructions that, when executed by the at least one processor individually or collectively, further cause the electronic device to:

display a preview image based on the second ROI comprising the first object and the second object on the display in case that a motion of the first object and a motion of the second object are stable.

3. The electronic device of claim 1, wherein the instructions that, when executed by the at least one processor individually or collectively, further cause the electronic device to:

track at least one object in case that the center of at least one object region of a first object region corresponding to the first object and a second object region corresponding to the second object is included in a predefined region within the FOV.

4. The electronic device of claim 1, wherein the instructions that, when executed by the at least one processor individually or collectively, further cause the electronic device to additionally detect a third object within the FOV; and perform a zooming out to display a third preview image in case that the third object is included in the predefined region.

5. The electronic device of claim 4, wherein the instructions that, when executed by the at least one processor individually or collectively, further cause the electronic device to:

display a preview image, based on the first object and the second object, in case that the additionally detected third object is not included in the predefined region for a predetermined time.

6. The electronic device of claim 1, wherein the instructions that, when executed by the at least one processor individually or collectively, further cause the electronic device to:

determine whether a motion of at least one object is repetitive within a predetermined range;

determine a region of interest, based on a size of a trajectory of the motion; and display a preview image based on the determined region of interest on the display.

7. The electronic device of claim 1, wherein, in case that at least one of the first object and the second object is out of the FOV of the camera, the at least one processor is configured to display a fourth preview image, based on the remaining object excluding the object which is out of the FOV.

8. The electronic device of claim 1, wherein, in case that a specific gesture is detected, the at least one processor is configured to adjust a region to be output as a preview image, in response to the gesture.

9. The electronic device of claim 1, wherein the at least one is configured to:

display a second preview image based on the second ROI in a first region of the display; and display an image of the detected first object and an image of the detected second object in a second region of the display.

10. The electronic device of claim 1, wherein the instructions that, when executed by the at least one processor individually or collectively, further cause the electronic device to:

compare a third object region corresponding to an object detected in an Mth frame and a fourth region corresponding to an object detected in an Nth frame, which is a frame after the Mth frame; and change a region of interest in case that at least one of a variance of a size of the object region and a variance of a location of the object region is greater than or equal to a threshold value, based on the comparison.

11. A method for operating an electronic device, the method comprising:

executing a camera;

detecting a first object within a field of view (FOV) of the camera;

acquiring a first preview image based on a first region of interest (ROI) comprising the first object on a display at a first magnification;

additionally detecting a second object within the FOV while the first preview image is displayed on the display; and acquiring a second preview image based on a second ROI comprising the first object and the second object on the display at a second magnification different from the first magnification.

12. The method of claim 11, comprising displaying a preview image based on the second ROI comprising the first object and the second object on the display in case that a motion of the first object and a motion of the second object are stable.

13. The method of claim 11, comprising tracking at least one object in case that the center of at least one object region of a first object region corresponding to the first object and a second object region corresponding to the second object is included in a predefined region within the FOV.

14. The method of claim 11, comprising:

determining whether a motion of at least one object is repetitive within a predetermined range;

determining a region of interest, based on a size of a trajectory of the motion; and displaying a preview image based on the determined region of interest on the display.

15. The method of claim 11, comprising displaying, in case that at least one of the first object and the second object is out of the FOV of the camera, a fourth preview image, based on the remaining object excluding the object which is out of the FOV.

16. An electronic device comprising:

a camera configured to detect an object, detect a motion of the object, and to generate a preview image including the object detected by the camera;

a display including a screen configured to display the preview image including the object;

memory, comprising one or more storage media, storing instructions; and a processor communicatively connected to the camera, the display and the memory, wherein the instructions, when executed by the at least one processor individually or collectively, cause the electronic device to:

adjust a location of the preview image in an object region of the screen and to adjust a zoom magnification of the preview image based on the motion of the object, and wherein the processor determines a margin region in the object region based on the motion of the object and ignores a portion of the object located in the margin region so as to prevent movement of the preview image.

17. The electronic device of claim 16, wherein the instructions that, when executed by the at least one processor individually or collectively, further cause the electronic device to generate the preview image without moving the camera.

18. The electronic device of claim 16, wherein the margin region is a region larger than the detected object.

* * * * *